(12) United States Patent (10) Patent No.: US 8,369,308 B2
Amagai (45) Date of Patent: Feb. 5, 2013

(54) REMOTE I/O SYSTEM AND SYNCHRONIZATION METHOD IN THE SAME

(75) Inventor: Akihiro Amagai, Tokyo (JP)

(73) Assignee: Sanritz Automation Co., Ltd. (JP)

( * ) Notice: Subject to any disclaimer, the term of this patent is extended or adjusted under 35 U.S.C. 154(b) by 373 days.

(21) Appl. No.: 12/824,400

(22) Filed: Jun. 28, 2010

(65) Prior Publication Data

US 2010/0260165 A1 Oct. 14, 2010

(51) Int. Cl.
*H04J 3/06* (2006.01)
(52) U.S. Cl. ........................................ 370/350; 370/503
(58) Field of Classification Search ............... 370/310.2, 370/328, 338, 349, 350, 503, 510, 512, 513, 370/514
See application file for complete search history.

(56) References Cited

U.S. PATENT DOCUMENTS

| 7,068,746 | B1 * | 6/2006 | Stichter | 375/356 |
| 2005/0259754 | A1 * | 11/2005 | Ho et al. | 375/240.28 |
| 2009/0177811 | A1 | 7/2009 | Amagai | |

\* cited by examiner

*Primary Examiner* — Brenda H Pham
(74) *Attorney, Agent, or Firm* — Schmeiser, Olsen & Watts, LLP

(57) ABSTRACT

The object of the present invention is to provide a synchronization method that enables more accurate synchronization on a clock included in each I/O node, in a node that forms a remote I/O system where a master node and I/O nodes communicate each other.

The master node includes a clocking means 14 for indicating the current time; a beacon recognizing means for detecting a reception of a beacon that is sent from a wireless LAN access point 3; a time detecting means 12 for determining a time stamp indicating when the reception of the beacon is detected based on the time indicated by the clocking means 14; a master list generating means 13 for generating a master list that is a list of the time stamp; and a master list sending means for sending the master list to the I/O nodes 2 through the wireless LAN access point 3, and the beacon contains a TSF timer value for identifying the beacon, and the master list contains the TSF timer value of the beacon corresponding to the time stamp indicating the time of the clocking means 14.

7 Claims, 3 Drawing Sheets

REMOTE I/O SYSTEM AND SYNCHRONIZATION METHOD IN THE SAME

FIELD OF THE TECHNOLOGY

The present invention relates to a remote I/O system and synchronization method in the same, and more specifically to the remote I/O system for communicating a frame that requires the synchronization and a synchronization method in the remote I/O system.

DESCRIPTION

A remote I/O system including a plurality of I/O devices have been known. An example will be shown below in which a master node sends data that is required to guarantee a delay in communication like distributed measurement control data or the like to one or more I/O nodes.

A clock included in each I/O node is to be referenced when the distributed measurement control data is output, but it usually has an error within the permissible range of its oscillator. The clock included in the I/O node may be actually ahead of or behind the clock included in the master node. The time kept by the clock included in the I/O node usually differs for each I/O node. That causes differences in time among the nodes.

In the case where the real-time distributed measurement control data is sent to an I/O node, it is apparent that the master node and the I/O node should be highly accurately synchronized.

As a specific approach to realize the requirement, there are methods for causing the I/O node to be synchronized with the master node. As a method for causing nodes to be synchronized on a wired LAN, the invention proposed by International Publication No. WO 2007/148416 can be considered.

In the proposal by International Publication No. WO 2007/148416, one of a plurality of nodes, each having a clock, serves as a master node as means of causing the nodes to be synchronized. The master node calculates time information between the points when it receives a communication frame and when it sends the communication frame, and sends the calculated time information included in a communication frame for synchronization to an I/O node. The I/O node calculates a communication delay between itself and the master node from the time stamp for the communication frame to pass the I/O node and the time information.

Therefore, a method for correcting a communication delay of a communication frame by using a guaranteed value as mentioned above cannot cope with the case in which the delay cannot be guaranteed due to the reasons including the throughput of the wireless LAN access point, and change or the like in the communication quality caused by packet loss.

The drawback becomes so serious when the technique is used in a business where accuracy of time is essential that its trustworthiness is damaged unless it separately has means of telling an accurate difference in time.

The present invention is adapted to solve the above-mentioned problems in the conventional art, and the object of the present invention is to provide a remote I/O system and a synchronization method in the remote I/O system that enable clocks in I/O nodes to be synchronized more accurately in a node that constitutes the remote I/O system where a master node and the I/O nodes communicate each other.

SUMMARY

A first aspect of the invention for solving the above-mentioned problems is a remote I/O system that has a master node and one or more I/O nodes connected to a wireless LAN through a wireless LAN access point, wherein the master node includes: clocking means for indicating the current time; beacon recognizing means for detecting a reception of a beacon that is sent from the wireless LAN access point to the master node and the I/O nodes; time detecting means for determining a time stamp indicating when the reception of the beacon is detected by the beacon recognizing means based on the time indicated by the clocking means; master list generating means for generating a master list that is a list of the time stamp; and a master list sending means for sending the master list containing the time stamp to the I/O nodes through the wireless LAN access point, wherein the beacon includes a TSF timer value for identifying the beacon, and the master list contains the TSF timer value of the beacon corresponding to the time stamp indicating the time of the clocking means that is contained in the master list.

A second aspect of the invention for solving the above-mentioned problems is a remote I/O system that has a master node and one or more I/O nodes connected to a wireless LAN through a wireless LAN access point, wherein the I/O node includes: clocking means for indicating the current time; beacon recognizing means for detecting a reception of a beacon that is sent from the wireless LAN access point to the master node and the I/O nodes; time detecting means for determining a time stamp indicating when the reception of the beacon is detected by the beacon recognizing means based on the time indicated by the clocking means; local list generating means for generating a local list that contains the time stamp and a TSF timer value contained in the beacon; master list receiving means for receiving the master list that is sent from the master node through the wireless LAN access point; and adjusting means for adjusting the time of the clocking means based on the time stamp contained in the master list and the time stamp determined by the time detecting means, wherein the master list that is received by the master list receiving means contains the TSF timer value of the beacon corresponding to the time stamp that is contained in the master list.

A third aspect of the invention for solving the above-mentioned problems is a remote I/O system that has a master node and one or more I/O nodes connected to a wireless LAN through a wireless LAN access point, wherein the master node includes: clocking means for indicating the current time; beacon recognizing means for detecting a reception of a beacon that is sent from the wireless LAN access point to the master node and the I/O nodes; time detecting means for determining a time stamp indicating when the reception of the beacon is detected by the beacon recognizing means based on the time indicated by the clocking means; master list generating means for generating a master list that is a list of the time stamp; and a master list sending means for sending the master list containing the time stamp to the I/O nodes through the wireless LAN access point, and the I/O nodes include: clocking means for indicating the current time; beacon recognizing means for detecting a reception of a beacon that is sent from the wireless LAN access point to the master node and the I/O nodes; time detecting means for determining a time stamp indicating when the reception of the beacon is detected by the beacon recognizing means based on the time indicated by the clocking means; local list generating means for generating a local list that contains the time stamp and a TSF timer value contained in the beacon; master list receiving means for receiving the master list that is sent from the master node through the wireless LAN access point; and adjusting means for adjusting the time of the clocking means based on the time stamp contained in the master list and the time stamp determined by the time detecting means, wherein the beacon includes the TSF timer value for identifying the beacon, and the master list contains the TSF timer value of the beacon corresponding to the time stamp indicating the time of the clocking means that is contained in the master list.

A sixth aspect of the invention for the solving the above-mentioned problems is a synchronization method in a remote I/O system that has a master node and one or more I/O nodes that are connected to the master node through wireless LAN for generating a time by receiving a signal that is sent out from the master node, including: a step of each of the master node and the I/O nodes receiving the same beacon that is sent from the same wireless LAN access point and extracting a TSF timer value contained therein; a step of generating a master list in the master node, wherein the master list contains a time stamp indicating the time of a clocking means included in the master node and a TSF timer value in the beacon; a step of sending out the master list from the master node to the I/O node as synchronizing information through the wireless LAN access point; a step of generating a local list in the I/O node, wherein the local list contains a time stamp indicating the time of clocking means included in the I/O node and a TSF timer value contained in the beacon; a step of receiving the master list that is sent from the master node at the I/O node through the wireless LAN access point; a step of calculating an amount of error by adding a difference between the time stamp in the local list and the time stamp in the master list that is sent out from the master node to a delay time difference that is for the I/O node to generate a time stamp to the master node after receiving the beacon; and a step of adjusting the clocking means to the same time as that of the master node by controlling the clocking means contained in the I/O node based on the amount of error.

The present invention has been described above, and as the synchronization of the clock of the master node and the clock of the I/O node uses only the beacon commonly received by the master node and the I/O node which are selected by comparing the TSF timer values in the beacon, the synchronization is free from an influence by changes in the communication quality that occur when the signal is passing through the wireless LAN access point, which secures the synchronization; the present invention has an advantage of providing a remote I/O system that is capable of more accurately synchronizing the clock in each of the I/O nodes and a synchronization method in the remote I/O system.

DETAILED DESCRIPTION

Figure 1:
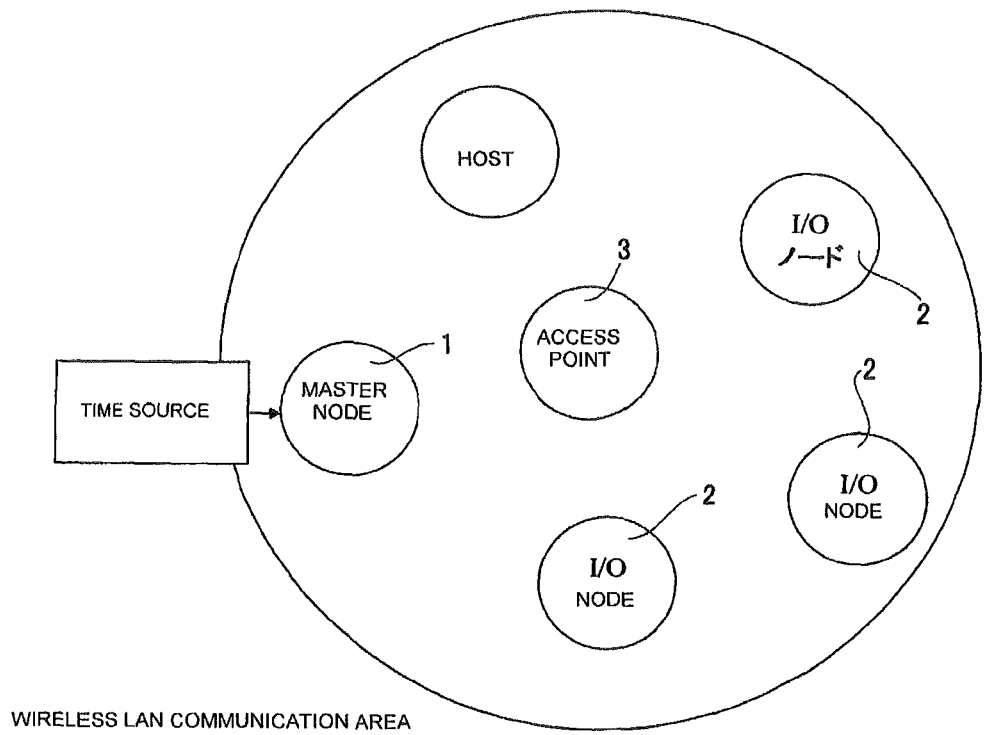
FIG. 1 is a block diagram showing an outlined configuration of a remote I/O system according to the present invention.

The preferred embodiment of the present invention will be described with reference to the attached drawings. FIG. 1 shows an outlined configuration of a remote I/O system according to the present invention; as shown therein, the remote I/O system includes a master node 1, one or more I/O nodes 2, and a wireless LAN access point 3. The master node 1 and the I/O nodes 2 are connected to a wireless LAN through a wireless LAN access point 3.

Figure 2:
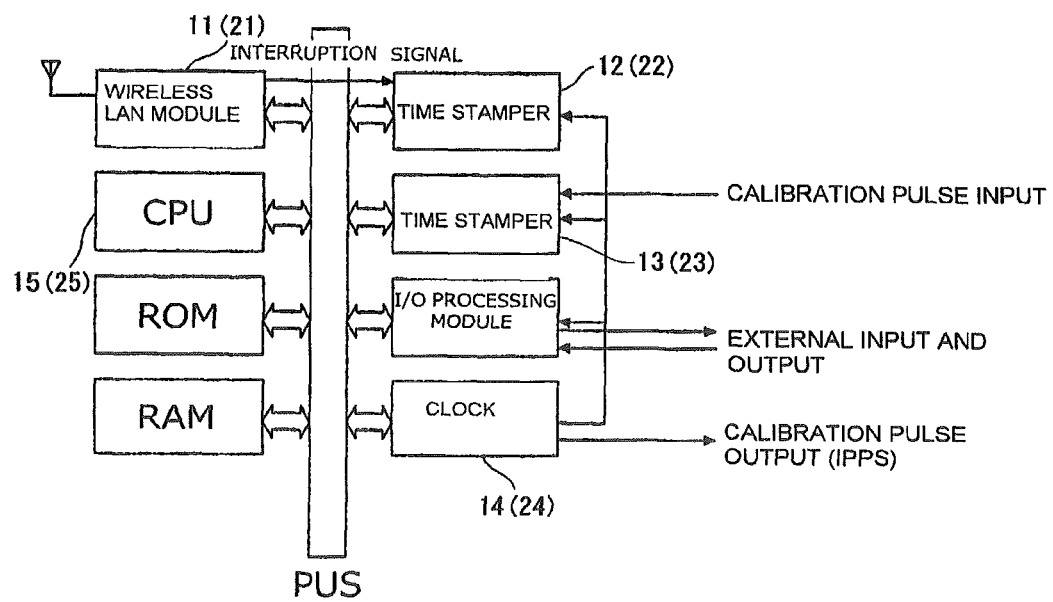
FIG. 2 is a schematic diagram inside a node in the remote I/O system according to the present invention.
Figure 3:
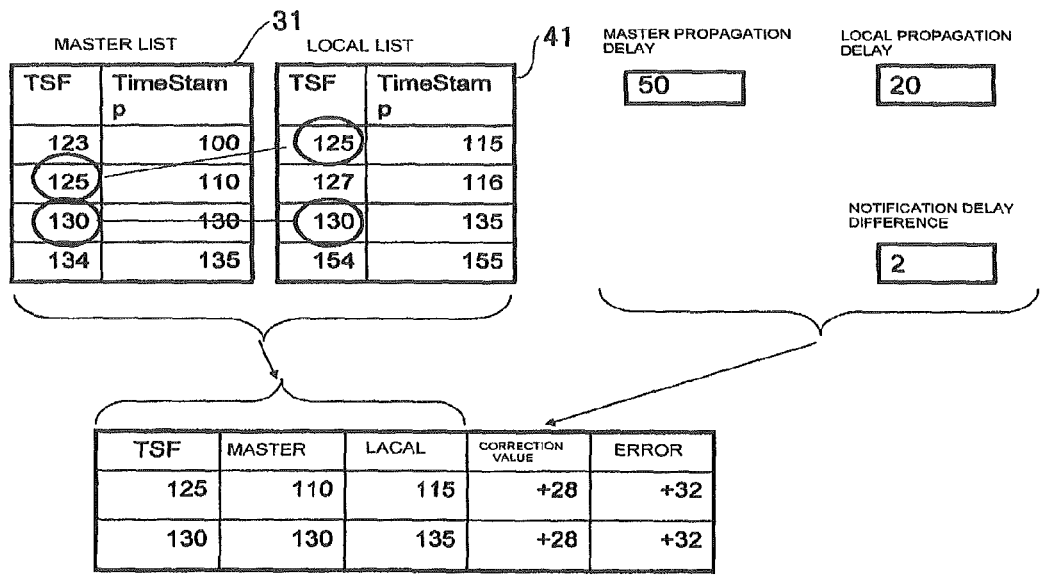
FIG. 3 is a chart for comparing time stamps of a synchronization method in the remote I/O system according to the present invention.
Figure 4:
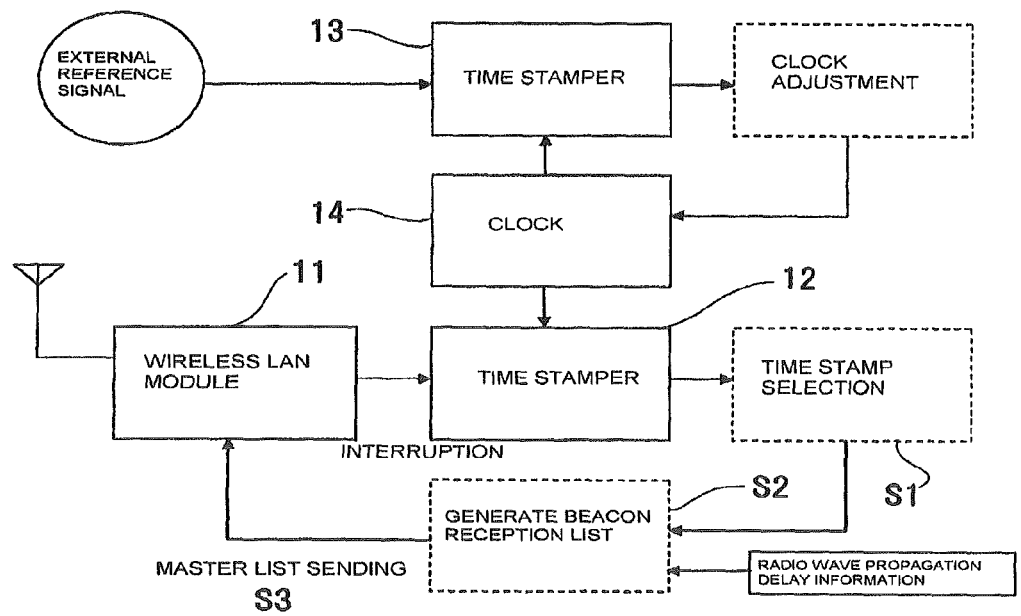
FIG. 4 is a functional block diagram showing a master node in the remote I/O system according to the present invention.
Figure 5:
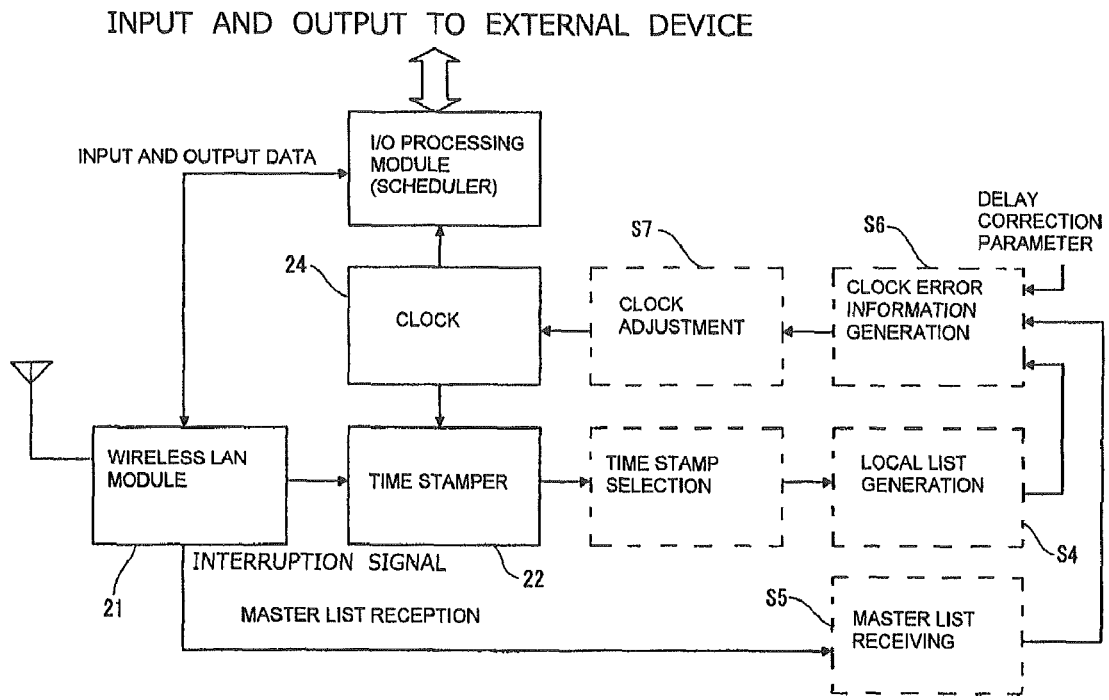
FIG. 5 is a functional block diagram showing an I/O node in the remote I/O system according to the present invention.

FIG. 2 shows a configuration inside a node of the master node 1 and the I/O node 2 in the remote I/O system; FIG. 3 shows a comparison of time stamps of a synchronization method; FIG. 4 is a functional block diagram of a master node; and FIG. 5 is a functional block diagram of an I/O node. In FIGS. 3 and 4, blocks shown by solid lines indicate hardware configuration and blocks shown by dashed lines indicate processing.

The wireless LAN access point 3 is a communication device for sending a beacon periodically. The beacon is sent from the wireless LAN access point 3 to the master node 1 and the I/O node 2 through the wireless LAN.

As shown in FIGS. 2 and 4, the master node 1 includes a wireless LAN module (including beacon recognizing means and master list sending means) 11, a time stamper (time detecting means) 12, a CPU (master list generating means) 13, and a clock (clocking means) 14. In the master node 1, a received beacon is recognized by the wireless LAN module 11, the wireless LAN module 11 notifies the time stamper 12 of a notification of the reception of a frame like the beacon as an interruption signal, and then the time stamper 12 instantly generates the time of the clock 14 as a time stamp.

The CPU 15 generates the master list 31 containing the TSF timer value and a time stamp (see FIG. 3), and then the master node 1 sends the master list 31 to the I/O node 2. The time between when the beacon reached the master node 1 and when the time stamp is generated is a Reception Notification Delay that is necessary for correcting time. The specific content of the Reception Notification Delay will be described later (from 0027 to 0029).

The master list 31 reaches the I/O node 2 through the wireless LAN access point 3. As shown in FIGS. 2 and 5, the I/O node 2 includes the wireless LAN module (including beacon recognizing means and master list receiving means) 21, the time stamper (time detecting means) 22, the CPU (including local list generating means and adjusting means) 23, and the clock (clocking means) 24.

Almost at the same moment as the master node 1 receives the beacon, the I/O node 2 receives the same beacon. Here, the received beacon is recognized by the wireless LAN module 21 in the I/O node 2, the wireless LAN module 21 notifies the time stamper 22 of a notification of the reception of a frame like the beacon as an interruption signal, and then the time stamper 22 instantly generates the time of the clock 24 as a time stamp and passes the time stamp to the CPU 25. In the CPU 25, a TSF timer value is derived from the beacon and a local list 41 containing the TSF timer value and the time stamp (see FIG. 3) is generated.

The time between when the beacon reached the I/O node 2 and when the time stamp is generated is a Reception Notification Delay that is necessary for correcting time. The specific content of the Reception Notification Delay will be described later (from 0027 to 0029).

Next, the master list 31 sent from the master node 1 reaches the I/O node 2. Here, the master list 31 is passed to the CPU 25, in which the TSF timer value is derived from the master list 31 and used for adjusting the clock 24.

For the adjustment, only the beacon commonly received by the master node 1 and the I/O node 2 are selected by comparing the derived TSF timer value with that in the local list 41, and the clock 24 is controlled so as to make the difference between the corresponding time stamps 0. In this process, the Reception Notification Delay difference for the I/O node 2 to generate the time stamp against the master node 1 after receiving the beacon, and the Radio Wave Propagation Delay difference are added as correction values. The propagation delay difference of radio wave is, as described later, a difference between the propagation delays of radio wave due to the places where each of the nodes are installed.

The Reception Notification Delay cannot be obtained respectively for the master node 1 and the I/O node 2, and only the relative time difference between the nodes is the information actually available. The relative time difference is obtained in advance and recorded in each I/O node 2.

Now, a way of obtaining the above-mentioned time difference will be described. At first, a calibration output of the master node 1 and the calibration input of the I/O node 2 are connected. From the calibration output of the master node 1, a pulse is output every second on the second. Then, synchronization between the master node 1 and the I/O node 2 is carried out over the wireless LAN. It is assumed here that the Reception Notification Delay difference is 0.

The I/O node 2 records the time stamp at the calibration input terminal. The time is based on the clock 24 in the I/O node 2. Then, a difference obtained of the time stamp from the second sharp is recorded as the Reception Notification Delay difference of the I/O node 2 against the master node 1.

When the physical relationship between the master node 1 and the wireless LAN access point 3 is known and also the propagation delay of radio wave between the I/O node 2 and the wireless LAN access point 3 is known (obtained from the distance between the I/O node 2 and the wireless LAN access point 3), the master list 31 from the master node 1 contains the propagation delay of radio wave between the master node 1 and the wireless LAN access point 3. Specifically, where the delay between the master node 1 and the wireless LAN access point 3 (Master Propagation Delay) is rm, the delay between the I/O node 2 and the wireless LAN access point 3 (Local Propagation Delay) is rs, the time stamp on the master node 1 side is tm, and the time stamp on the I/O node 2 side is ts, the clock in the I/O node 2 should be put forward by (tm−ts)−(rm−rs) to correct the clock.

If the physical distance between the master node 1 and the wireless LAN access point 3 is unknown, the master list 31 containing an invalid value (e.g., −1) for the delay is sent. In that case, the I/O node 2 determines that the delay information in the synchronization packet is invalid and proceeds to synchronization without correcting the propagation delay by taking the propagation delay difference of radio wave unavailable. Similarly, if the propagation delay on the I/O node 2 side is unknown, the I/O node 2 proceeds to synchronization without correcting the delay. In those cases, the time difference in the propagation of radio wave is left as a synchronization error, which lowers the accuracy; however, as the synchronization accuracy available in the synchronization system is no more than tens of nanoseconds, the lowering of the accuracy can be ignored when the difference in the distances to the wireless LAN access point 3 is 10 meters or less.

Unlike the conventional methods, in the remote I/O system according to the present invention with the above-mentioned configuration, the master list 31 that is the synchronization information sent out from the master node 1 to the I/O node 2 contains the TSF timer value in the beacon as well as the time stamp.

This is the same in the I/O node 2 such that the local list 41 generated in the I/O node 2 contains the time stamp of the clock 24 in the I/O node 2 and the TSF timer value in the beacon. As such, both of the master list 31 and the local list 41 generated in the remote I/O system according to the present invention have the TSF timer value included in the beacon as their labels.

As synchronization of the clock 14 of the master node 1 and the clock 24 of the I/O node 2 uses only the beacon commonly received by the master node 1 and the I/O node 2 which are selected by comparing the TSF timer values in the beacon, the synchronization is free from an influence by changes in the communication quality that occur when the signal is passing through the wireless LAN access point 3 connecting the master node 1 and the I/O node 2.

By controlling the clock 24 in the I/O node 2 with reference to the master list 31 in the master node 1, and using the Reception Notification Delay differences generated by both nodes 1 and 2 to generate the time stamps, and the time difference in the propagation of radio wave as correction values, so as to make the difference between the time stamps of both nodes 1 and 2 '0', the time of the clocks in the master node 1 and the I/O node 2 can be completely matched.

The synchronization method in the I/O system according to the present invention is the synchronization method in a remote I/O system that has a master node 1 and one or more I/O nodes 2 that are connected to the master node 1 through the wireless LAN for generating a time by receiving a signal that is sent out from the master node 1 and includes the steps below.

A step of each of the master node 1 and the I/O nodes 2 receiving the same beacon that is sent from the same wireless LAN access point 3 and extracting a TSF timer value included therein (step S1).

A step of generating a master list 31 in the master node 1, wherein the master list 31 includes a time stamp indicating the time of a clock 14 included in the master node 1 and a TSF timer value in the beacon (step S2).

A step of sending out the master list 31 from the master node 1 to the I/O node 2 as synchronizing information through the wireless LAN access point 4 (step S3).

A step of generating a local list 41 in the I/O node 2, wherein the local list 41 contains a time stamp indicating the time of a clock 24 included in the I/O node and a TSF timer value included in the beacon (step S4).

A step of receiving the master list 31 that is sent from the master node 1 at the I/O node 2 through the wireless LAN access point 3 (step S5).

A step of calculating an amount of error by adding a difference between the time stamp in the local list 41 and the time stamp in the master list 31 that is sent out from the master node 1 to a delay time difference that is for the I/O node 2 to generate a time stamp to the master node 1 after receiving the beacon, and the time difference in the propagation of radio wave (step S6).

A step of adjusting the clock 24 to the same time as that of the master node 1 by controlling the clock 24 included in the I/O node 2 based on the amount of error (step S7).

The present invention has been detailed to some extent by taking an example of the preferred embodiment. As it is apparent that various modifications can be made without departing from the scope and spirit of the invention, the present invention should not be limited to the specific embodiment described herein except for the limitation stated in the claims.

What is claimed is:

1. A remote I/O system comprising:
a master node and one or more I/O nodes connected to a wireless LAN through a wireless LAN access point,
wherein the master node comprises: a clocking means for indicating a current time; a beacon recognizing means for detecting a reception of a beacon that is sent from the wireless LAN access point to the master node and the one or more I/O nodes; a time detecting means for determining a time stamp indicating when the reception of the beacon is detected by said beacon recognizing means based on a time indicated by said clocking means; a master list generating means for generating a master list that is a list of the time stamp; and a master list sending means for sending the master list containing the time stamp to the one or more I/O nodes through the wireless LAN access point, wherein the beacon includes a TSF timer value for identifying the beacon, and the master list contains the TSF timer value of the beacon corresponding to the time stamp indicating the time of said clocking means that is contained in the master list.

2. The remote I/O system according to claim 1, wherein an adjusting means for adjusting the time of said clocking means corrects the time by taking as an amount of error a value obtained by adding a difference between the time stamp in the local list and the time stamp in the master list that is set out from the master node to a delay time difference that is for the I/O node to generate a time stamp for the master node after receiving the beacon.

3. The remote I/O system according to claim 2, wherein said adjusting means for adjusting the time of said clocking means further corrects the time by taking the difference in the propagation delays of radio wave due to the places where each the nodes are installed as a correction value.

4. A remote I/O system comprising:
a master node and one or more I/O nodes connected to a wireless LAN through a wireless LAN access point,
wherein the one or more I/O nodes comprise node comprises: a clocking means for indicating a current time; a beacon recognizing means for detecting a reception of a beacon that is sent from the wireless LAN access point to the master node and the one or more I/O nodes; a time detecting means for determining a time stamp indicating when the reception of the beacon is detected by said beacon recognizing means based on a time indicated by said clocking means; a local list generating means for generating a local list that contains the time stamp and a TSF timer value contained in the beacon; a master list receiving means for receiving the master list that is sent from the master node through the wireless LAN access point; and an adjusting means for adjusting the time of said clocking means based on the time stamp contained in the master list and the time stamp determined by said time detecting means,
wherein the master list that is received by said master list receiving means contains the TSF timer value of the beacon corresponding to the time stamp that is contained in the master list.

5. A remote I/O system comprising:
a master node and one or more I/O nodes connected to a wireless LAN through a wireless LAN access point,
wherein the master node comprises: a first clocking means for indicating a current time; a first beacon recognizing means for detecting a first reception of a beacon that is sent from the wireless LAN access point to the master node and the one or more I/O nodes; a first time detecting means for determining a first time stamp indicating when the first reception of the beacon is detected by said first beacon recognizing means based on a time indicated by said first clocking means; a first master list generating means for generating a first master list that is a list of the first time stamp; and a first master list sending means for sending the first master list containing the first time stamp to the one or more I/O nodes through the wireless LAN access point, and
wherein the I/O nodes comprise: a second clocking means for indicating the current time; a second beacon recognizing means for detecting a second reception of the beacon that is sent from the wireless LAN access point to the master node and the one or more I/O nodes; a second time detecting means for determining a second time stamp indicating when the reception of the beacon is detected by said second beacon recognizing means based on the time indicated by said second clocking means; a local list generating means for generating a local list that contains the second time stamp and a TSF timer value contained in the beacon; a second master list receiving means for receiving a second master list that is sent from the master node through the wireless LAN access point; and an adjusting means for adjusting the time of the clocking means based on the time stamp contained in the master list and the time stamp determined by said time detecting means,
wherein the beacon contains the TSF timer value for identifying the beacon, and the first and second master list contains the TSF timer value of the beacon corresponding to the first and second time stamp indicating the time of said first and second clocking means that is contained in the first and second master list.

6. A synchronization method in a remote I/O system that has a master node and one or more I/O nodes that are connected to the master node through a wireless LAN for generating a time by receiving a signal that is sent out from the master node, comprising:
a step of each of the master node and the one or more I/O nodes receiving the same beacon that is sent from the same wireless LAN access point and extracting a TSF timer value contained therein;
a step of generating a master list in the master node, wherein the master list contains a time stamp indicating the time of a clocking means included in the master node and a TSF timer value in the beacon;
a step of sending out the master list from the master node to the one or more I/O nodes as synchronizing information through the wireless LAN access point;
a step of generating a local list in the one or more I/O nodes, wherein the local list contains a time stamp indicating the time of clocking means included in the one or more I/O nodes and a TSF timer value contained in the beacon;
a step of receiving the master list that is sent from the master node at the one or more I/O nodes through the wireless LAN access point;
a step of calculating an amount of error by adding a difference between the time stamp in the local list and the time stamp in the master list that is sent out from the master node to a delay time difference that is for the one or more I/O nodes to generate a time stamp to the master node after receiving the beacon; and
a step of adjusting the clocking means to the same time as that of the master node by controlling the clocking means contained in the one or more I/O nodes based on the amount of error.

7. The synchronization method in a remote I/O system according to claim 6, wherein the step of adjusting the clocking means to the same time as that of the master node by controlling the clocking means contained in the one or more I/O nodes further comprises a step of correcting the time by taking the difference in the propagation delays of radio wave due to the places where each the nodes are installed as a correction value.

* * * * *